Dec. 19, 1967  P. E. MILLER  3,359,147
NON-WOVEN PATTERNED PILE MAKING METHOD AND APPARATUS
Filed Dec. 30, 1963  6 Sheets-Sheet 1
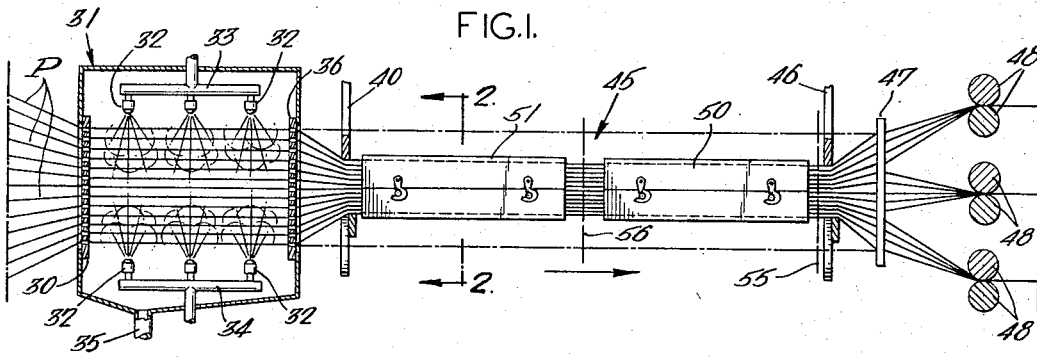
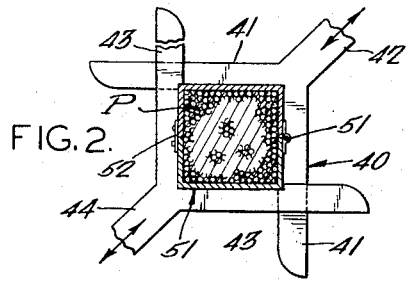
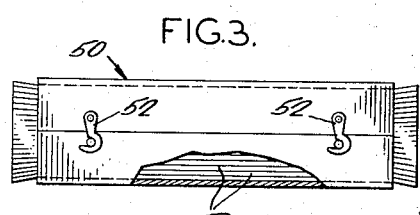
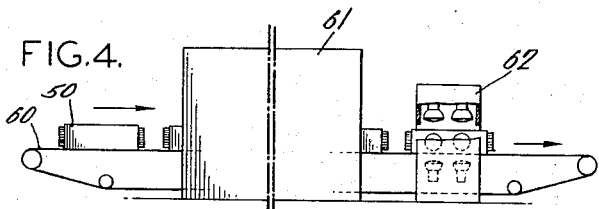
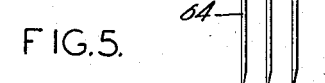
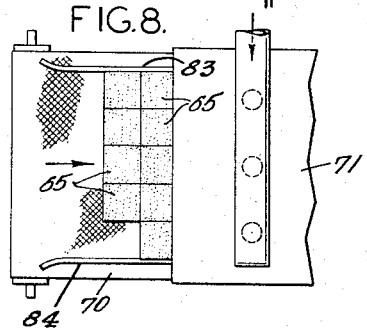
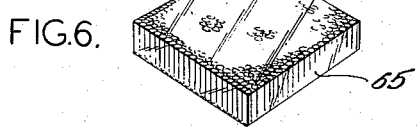
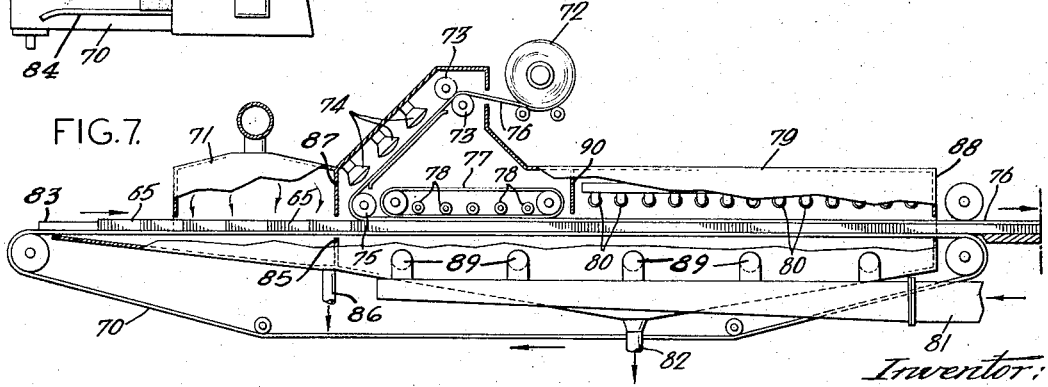
Inventor:
Paul E. Miller
by H. W. Balcued, atty.

Dec. 19, 1967 P. E. MILLER 3,359,147
NON-WOVEN PATTERNED PILE MAKING METHOD AND APPARATUS
Filed Dec. 30, 1963 6 Sheets-Sheet 2
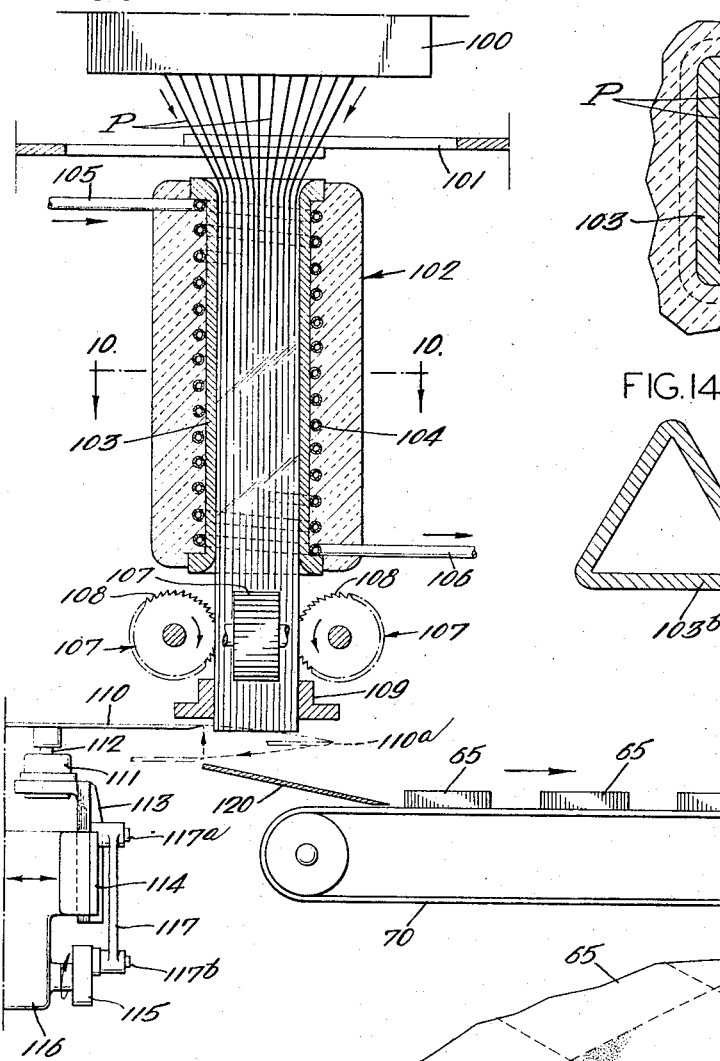
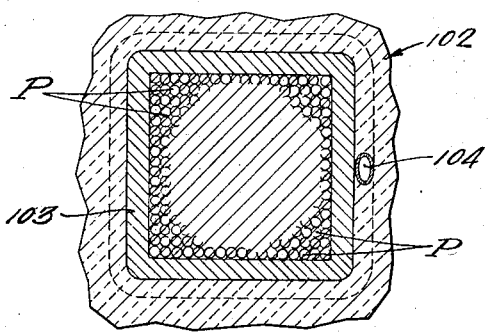
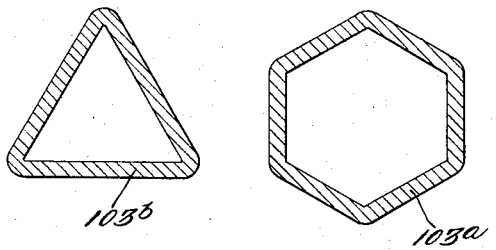
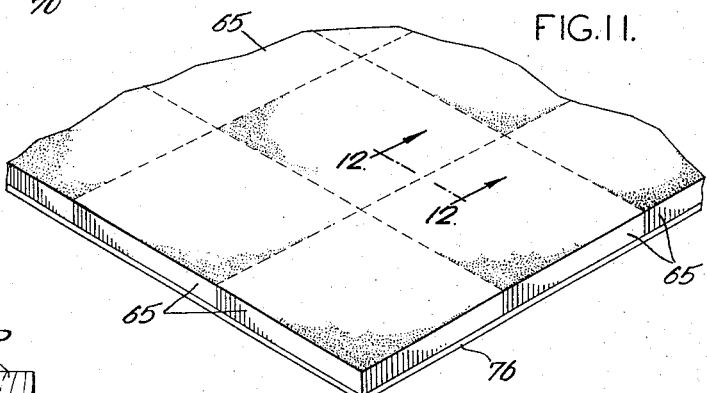
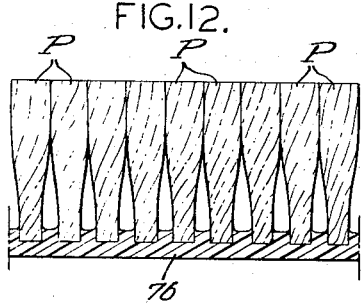
Inventor:
Paul E. Miller Dec. 19, 1967   P. E. MILLER   3,359,147
NON-WOVEN PATTERNED PILE MAKING METHOD AND APPARATUS
Filed Dec. 30, 1963   6 Sheets-Sheet 3

Inventor:
Paul E. Miller
by H. W. Ballard
Atty.

Dec. 19, 1967      P. E. MILLER      3,359,147

NON-WOVEN PATTERNED PILE MAKING METHOD AND APPARATUS

Filed Dec. 30, 1963      6 Sheets-Sheet 4

Inventor:
Paul E. Miller
by Hyde W. Ballard
Atty.

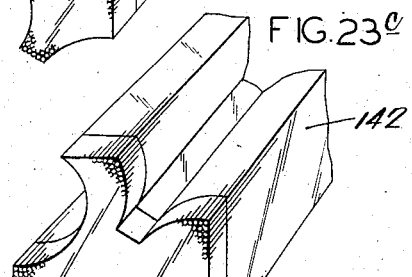
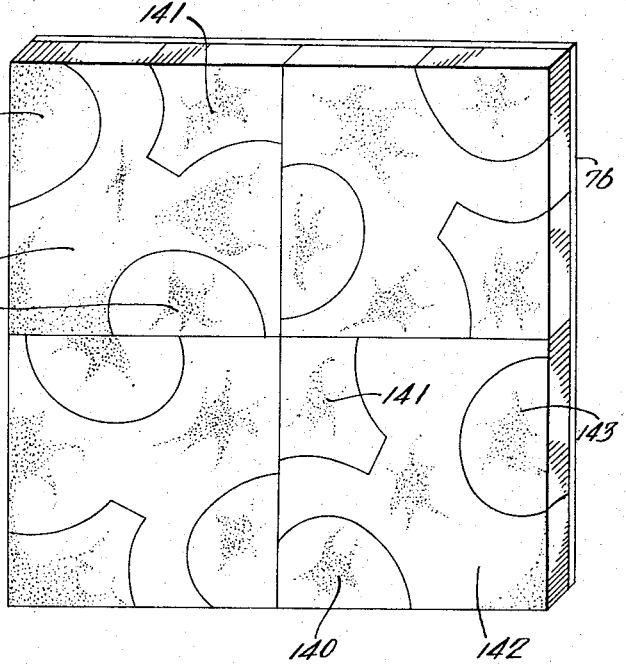
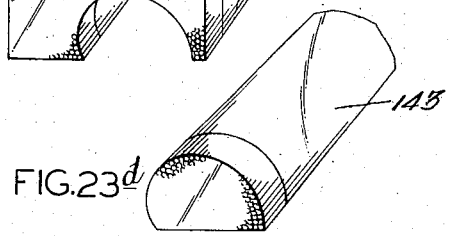
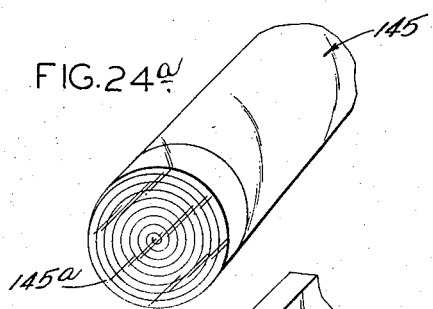
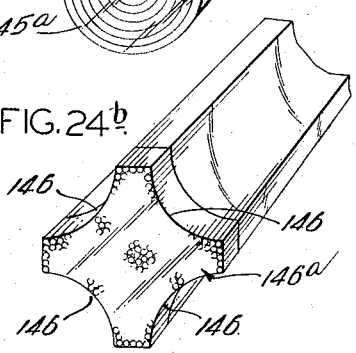
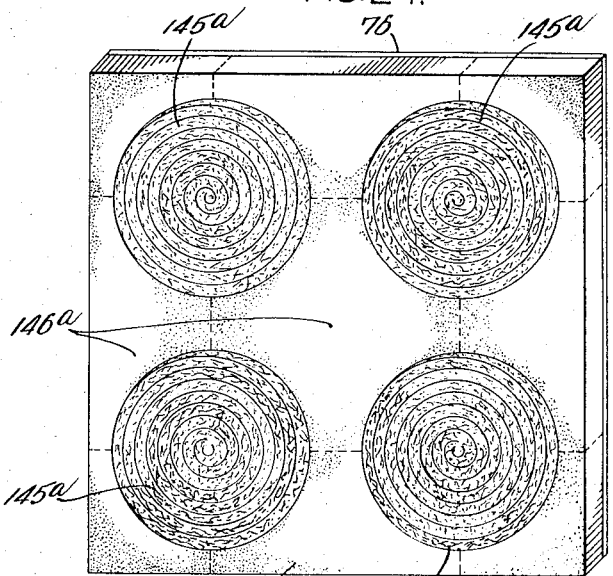

Dec. 19, 1967     P. E. MILLER     3,359,147

NON-WOVEN PATTERNED PILE MAKING METHOD AND APPARATUS

Filed Dec. 30, 1963     6 Sheets-Sheet 6

Inventor:
Paul E. Miller
by Hyde W. Ballard
Atty.

United States Patent Office 3,359,147
Patented Dec. 19, 1967

3,359,147
NON-WOVEN PATTERNED PILE MAKING
METHOD AND APPARATUS
Paul E. Miller, 113 Liberty Ave.,
Norristown, Pa. 19401
Filed Dec. 30, 1963, Ser. No. 334,176
13 Claims. (Cl. 156—72)

ABSTRACT OF THE DISCLOSURE

The present invention is directed to an entirely separate method and apparatus which is fundamentally characterized by the initial arrangement of a series of running lengths of pile material in a predetermined pattern or relationship. The pile material is then subjected to a solidifying or freezing treatment whereupon regular or irregular shapes may be severed from the solidified mass and subsequently adhered to either a separate backing material or to each other to form a completed fabric suitable for carpet tiles, area rugs or broadloom carpeting.

---

This invention relates to the manufacture of pile fabrics and particularly to methods of producing a non-woven pile fabric suitable for upholstery, floor coverings and the like.

The production of a pile fabric in which the pile material is secured to the backing by means of apparatus other than a loom, knitting machine, or a tufting machine has been tried heretofore with little or no practical success. Such procedure is known generally as "non-woven" and the fabric produced thereby is referred to as a "non-woven" pile fabric. Strictly speaking this term is a misnomer, because it is only in a loom such as a Wilton, velvet or Axminster that the pile is actually woven into the base fabric during the manufacture of the backing. In a knitted pile fabric, of course, this procedure is followed, but the base fabric is a knitted material as distinguished from a woven material. In a tufting machine, which inserts the pile material through a backing sheet, the pile yarns are held under the previously woven sheet with a series of loopers. In present commercial practice the backing sheet used in tufting is a woven material such as jute, but other materials are used for backing including knitted fabric and non-woven sheet material.

The present invention enables an extremely wide latitude of style variations to be achieved due to the arrangement and the placing of the pile yarns. Such latitude has only been approached heretofore in the Axminster loom.

A primary object of the present invention is to provide a frozen basic unit or slab of pile material arranged in a manner to achieve the desired design effect. The units are sliced or cut from an elongated block while in the frozen state and then secured to a backing whereupon the rigid condition of the pile yarns is eliminated to produce a soft pile surface.

A further object of the invention is to provide an apparatus for producing frozen slabs of pile material prior to their formation into a pile material.

A further object of the invention is to provide apparatus for producing frozen slabs of pile material by means of a batch procedure.

A further object of the invention is to provide apparatus for producing frozen slabs of pile material by means of a continuous procedure.

A further object of the invention is to provide an improved pile fabric unit suitable for use as a soft floor covering.

A further object of the invention is to provide an improved method for producing the pile yarn unit.

Further objects will be apparent from the specification and drawings in which

Figure 34:
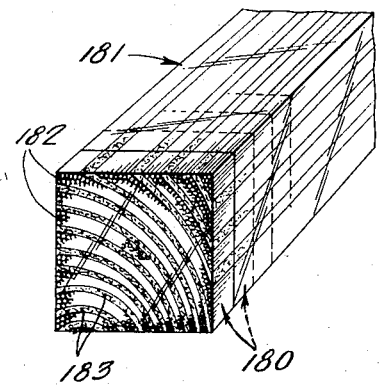
Figure 35:
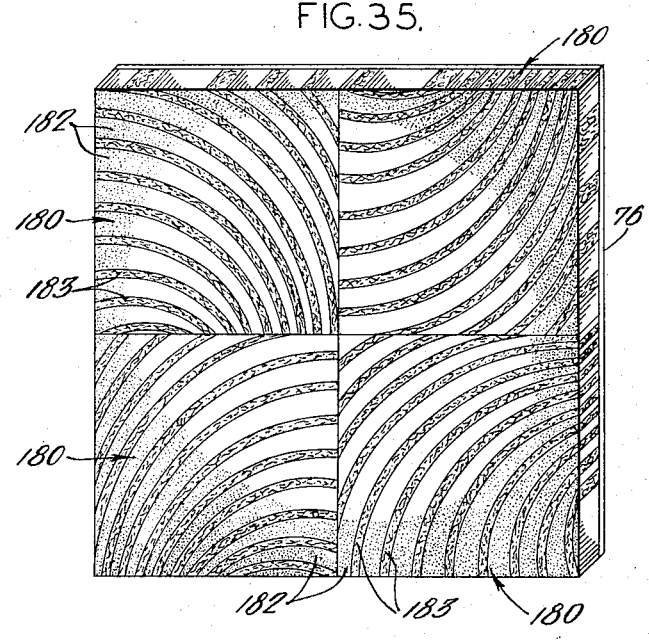
Figure 15:
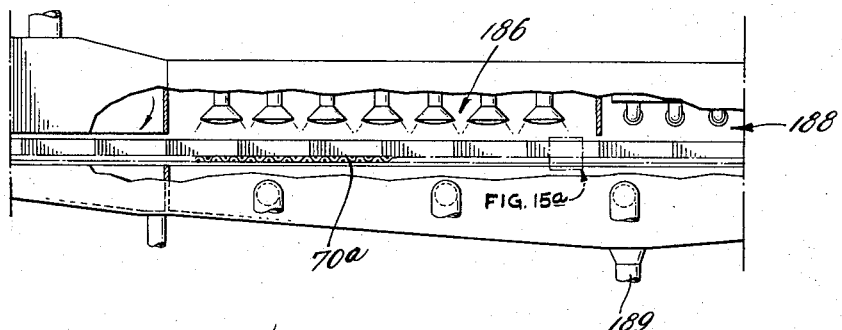
Figure 15A:
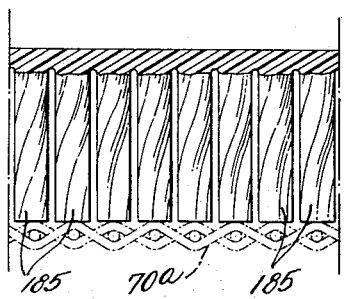
Figure 16:
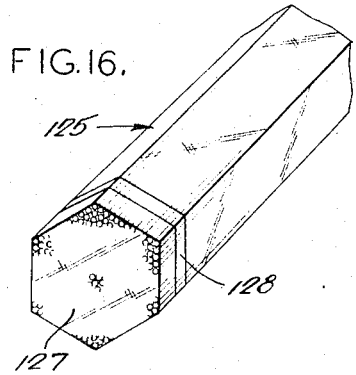
Figure 17:
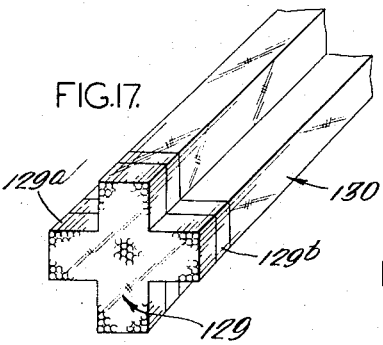
Figure 18:
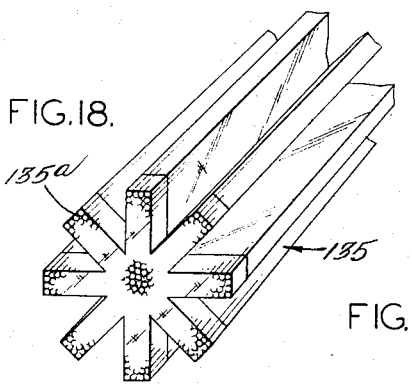
Figure 19:
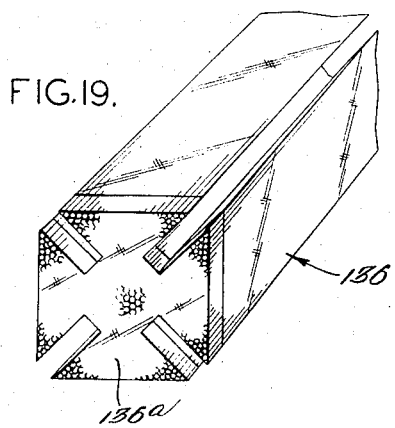
Figure 20:
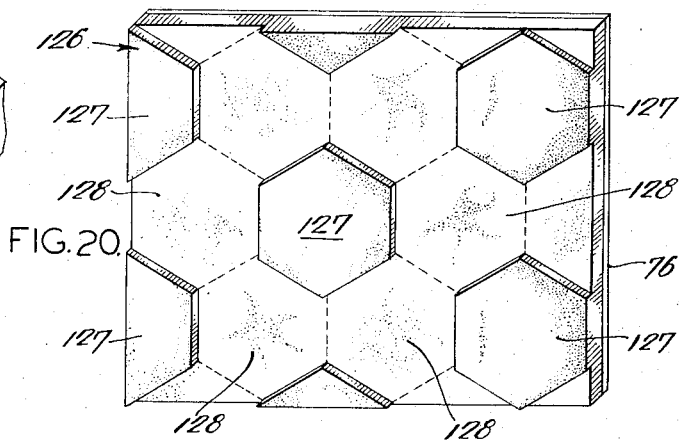
Figure 21:
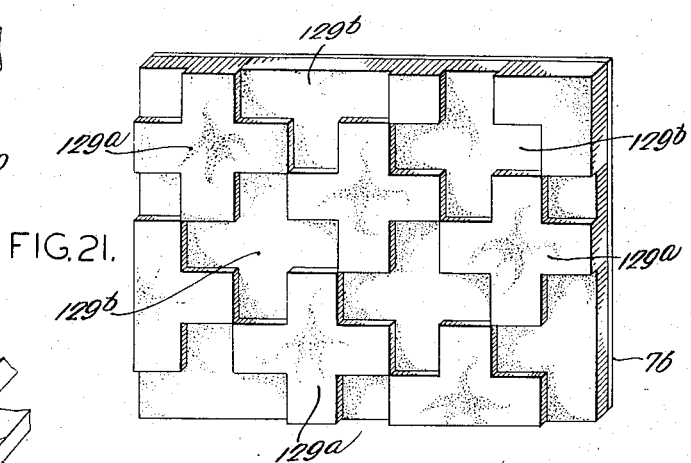
Figure 22:
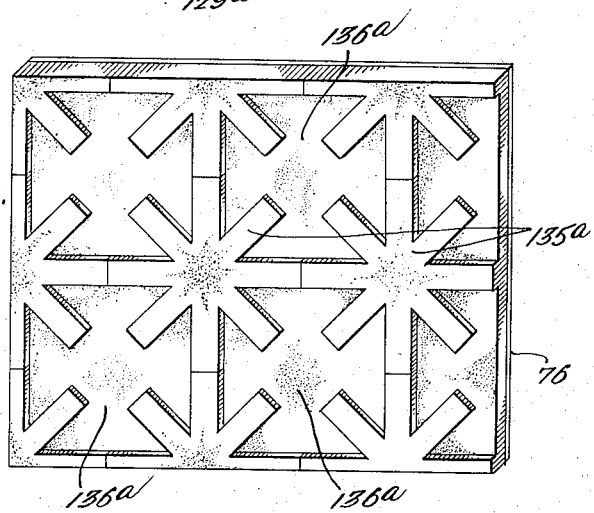
Figure 25:
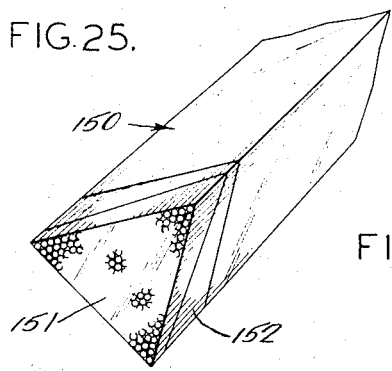
Figure 26:
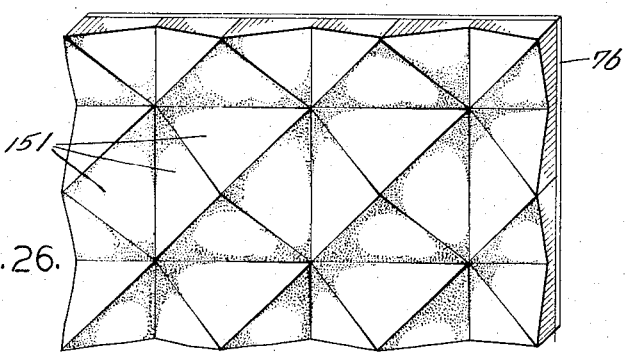
Figure 27:
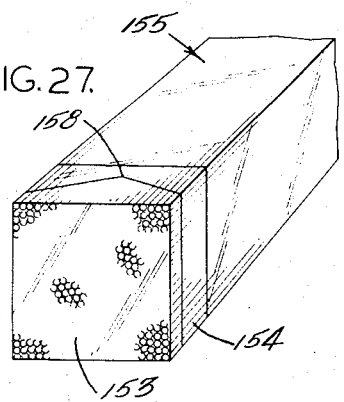
Figure 28:
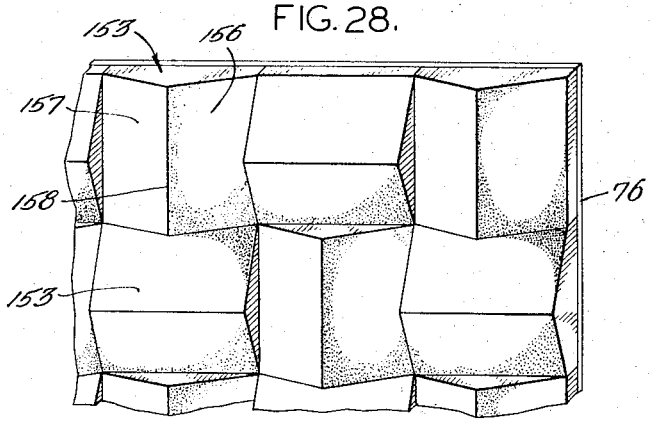

FIG. 1 is a schematic view, partly sectioned, of a frozen pile material slab forming machine, FIG. 2 is a transverse section as seen at 2—2 of FIG. 1, FIG. 3 shows one of the pile material retainers after removal from the apparatus of FIG. 1, FIG. 4 shows a series of the retainers of FIG. 3 passing through a freezing zone and a subsequent flash heating zone, FIG. 5 shows one method of producing multiple slabs or slices from the frozen block produced in the apparatus of FIG. 4, FIG. 6 is a perspective of one of the blocks that are shown being cut in FIG. 5, FIG. 7 is a side view, partially sectioned, of an apparatus for securing a plurality of the blocks to a backing material, FIG. 8 is a fragmentary top view of the feeding portion of the structure of FIG. 7, FIG. 9 is a schematic view, partly sectioned, of a continuous apparatus for producing slabs or blocks of pile material, FIG. 10 is a transverse section as seen at 10—10 of FIG. 9, FIG. 11 is a fragmentary perspective of a soft surface pile material formed with the units produced with the apparatus of either FIGS. 1 or 9, FIG. 12 is an enlarged sectional detail as seen at 12—12 of FIG. 11, FIGS. 13 and 14 are modified geometrical pile slabs which may be produced with the apparatus of either FIGS. 1 or 9, FIG. 15 is a view similar to FIG. 7 in which the blocks are subjected to elevated temperature, thereby causing the pile yarns to fuse and automatically form a supporting base layer, FIG. 15a is an enlarged sectional detail of the fabric produced with the apparatus of FIG. 15 after fusing the pile material and before drying, FIGS. 16–19 are perspectives of solidified bundles of pile material such as yarns having various geometrical shapes prior to the severing of cakes or slabs therefrom, FIG. 20 shows a top view of a pile fabric section produced from slabs or cakes cut from the bundle of FIG. 16, FIG. 21 shows a pile fabric and the design produced from slabs cut from the bundle of FIG. 17, FIG. 22 shows a pile fabric produced from an interlocking arrangement of slabs cut from the complementary bundles shown in FIGS. 18 and 19, FIG. 23 is a view of a pile fabric formed from a more complex arrangement using a plurality of pile slabs cut from bundles shown in FIGS. 23a, 23b, 23c, and 23d, FIG. 24 shows a pile fabric with a scroll motif using slabs cut from the bundles of FIGS. 24a and 24b, FIG. 25 shows a solidified pile material from which slabs having non-parallel faces are cut, FIG. 26 shows a multi-height pile fabric formed with the slabs cut from the bundle of FIG. 25, FIG. 27 shows a bundle of solidified pile yarns in which the cutting planes to form the individual slabs are plano-prismatic, FIG. 28 shows an example of a sculptured or multi-height pile fabric produced from slabs cut from the bundle of FIG. 27, FIGS. 29–33 illustrate solidified bundles of pile material but each having a variation in the shape of the top cut and from which can be formed all manner of multi-height pile fabrics of the type generally exemplified in FIGS. 26 and 28, FIG. 34 shows a solidified bundle of pile material arranged in expanding arcuate form, and FIG. 35 shows a pile fabric formed of slabs cut from the bundle of FIG. 34.

The invention comprises essentially the provision of blocks or slabs of solidified pile material which may be either yarns, rovings, slivers, filaments or sheets of any material suitable for forming the pile of a pile fabric. The slabs or blocks may be of a wide variety having both geometrical and non-geometrical forms. The contour of the slabs can be made to vary in the horizontal plane as well as the vertical plane, thus giving not only interlocking variations, but also a wide variety of multi-height or sculptured pile effects. The ability to intermingle any arrangement of differently colored or different types of pile material is an outstanding feature of the present invention. The blocks of pile material after being severed from a larger bundle are arranged in the desired relationship with each other and sealed either to a backing material by means of elevated temperature or the bottom portions of the slabs may be fused to form a continuous homogeneous backing if the pile material is of a fusible thermoplastic nature.

Referring now more particularly to the drawings, the pile material, usually in the form of pile yarn P (FIG. 1) is fed from a creel or other convenient source through an eyeboard 30 into a moistening chamber 31 where it is subjected ot a wetting treatment preferably by means of water or water vapor ejected from a series of nozzles 32, 32 secured in upper and lower manifolds 33 and 34. A suitable drain for excess liquid is supplied at 35. The yarns or pile material having been prearranged in the desired pattern relationship leave the moistening chamber 31 through a second eyeboard or guide 36. From thence, they pass through a pressure loaded condenser assembly 40 (FIG. 2) which in the case of a rectangular bundle comprises the guiding and compressing arms 41, 41 secured to a support 42 and complementary or interlocking guiding arms 43, 43 secured to a support 44. These supports are conveniently spring or pressure loaded to apply the desired compressive action to form a closely compacted bundle of parallel pile yarns as seen clearly in FIGS. 1, 3 and 5. Likewise, the supports 42 and 44 may be retracted to permit initial threading of the apparatus. From the condenser, the yarns pass through an elongated molding and cutting zone 45 and thence through a second condenser 46 of the same general construction as shown in FIGURE 2. The yarns then travel through the trailing eyeboard 47 and pairs of draw rollers 48, 48. During the initial threading of the apparatus of FIGURE 1, the yarns are individually laced through the eyeboards 30, 36, and 47 and may be drawn by means of the feed rolls 48. As soon as the yarns have been threaded and in proper compacted relationship, a plurality of molds 50 and 51 are secured around the moistened yarn bundles in the zone 45. These molds are conveniently hinged at 51 (FIGURE 2) and have suitable latches 52, 52 opposite the hinges. With the equipment set up as shown in FIGURE 1 for batch operation, the operator severs the yarn bundles at 55 and 56 thus removing a compact bundle of yarn or pile material in mold 50. The mold 51 is then advanced to the position originally occupied by mold 50 whereupon another mold is clamped around the pile material in the space previously occupied by mold 51. After the initial cutting, the condenser 46, eyeboard 47, and draw rolls 48 need not be used since the molds are alternately employed to draw the pile material from the yarn supply through the moisture chamber 31.

As the various bundles in molds 50 and 51 are cut or severed from the main source of pile material they are then placed upon a conveyor 60 (FIGURE 4) and advanced through a freezing chamber 61 so that the water or other liquid that has been applied to the pile material in moistener 31 is solidified. After the freezing or solidifying treatment in zone 61, the molds are subjected to flash heating in zone 62 to enable the molds to be removed by releasing latches 52 and opening the molds on hinges 51. The solidified bundle of pile material 63 may then be advanced to a cutting zone (FIGURE 5) where a gang saw 64 is actuated to cut a series of blocks or slabs 65 from the bundle. It will be understood that in the form of FIGS. 1–6 the bundles are of substantially square configuration and the slabs are shown as rectangular with parallel ends. The apparatus can be modified to provide blocks or slabs 65 of a wide variety of shapes as will be more fully described hereinafter.

The cut slabs or blocks 65 are placed upon a conveyor which may be a foraminous belting 70 and arranged in side to side relationship as shown in FIGURE 8. The blocks are then advanced through a premelting chamber 71 in which a blast of air at elevated temperature is directed onto the tops of the slabs. As the blocks advance with conveyor 70, a sheet of thermoplastic or other backing material is fed from a source 72 through feed rolls 73 and past a plurality of plasticising or softening heat lamps 74 and around roller 75 to superimpose the plastic sheet 76 on the slabs. Suitable pressure is then applied by means of a pressure belt 77 having a plurality of pressure rollers 78, 78 which provide adequate contact between the premelted tops of the slabs 65 and the sheet 76. In this condition the conveyor continuously advances the slabs and the backing material into a curing chamber 79 where the final fusing or attaching of the backing sheet 76 is effected with the tops of all of the pile material in the slabs 65 by means of heating elements 80, 80. Heated gas is simultaneously applied to the bottoms of the slabs through a duct 81 to melt the solidifying material so that it flows downwardly through the drain 82. It will be understood that the slabs 85, 85 are guided and positioned adjacent to each other as shown in FIG. 8 by means of the forwardly flared guide rails 83 and 84 and they are carried in this condition throughout their traverse on belt 70 as shown in FIGURE 7. A baffle 85 (FIG. 7) directs any pre-melted material through discharge drain 86. As the slabs travel from the pre-melting chamber 71 into the curing chamber 79 past the baffle 85 and the down stream wall 87 of chamber 71, the melting process continues so that at some point between baffle 85 and the down stream terminus 88 of curing chamber 79, the pile material becomes completely dry. Depending upon the temperature of the heated gas introduced through duct 81 and discharged through ports 89, 89 the point at which complete melting takes place may vary within the curing chamber. For example, it may take place either wholly or partially prior to reaching the baffle 90 in the curing chamber so that the support for the pile material is transferred from the combination of the solidifying material and the guides 83, 84 to the backing material 76 in which the pile is anchored. In addition to the function of removing or liquefying the remaining solidifying material, the heated gas introduced through duct 81 assists in the complete drying and curing of the pile. Depending upon the pile height i.e. the thickness of the slabs and the type of material, complete melting and drying may take place prior to baffle 90 and even if desired prior to leaving chamber 71. On the other hand relatively small amounts of liquid solidifying material may be present upon entering curing chamber 79 but these will be completely removed before leaving the chamber. After leaving the curing chamber 79, the pile material is substantially in finished form and comprises a series of pile projections securely adhered to the backing 76. The usual finish treatments, if any, may be applied such as a finish shearing or the commonplace treatments for anti-static, etc., etc.

Referring now to FIGURES 9 and 10, the apparatus for producing the bundles and slabs in a continuous manner will be described. The pile material P shown in the form of yarns or strands is fed from a source not shown through a conditioning or moistening chamber 100 (FIG. 9) and from thence the yarns may be threaded through a condenser 101 which is generally similar to condenser 40 in FIGURE 1. In the showing of FIGURE 9, the condenser 101 is expanded, but depending upon the relative location of the wetting chamber it may be used to control the feeding of the pile material P as may be needed. A freezing chamber 102 comprises an inner sleeve 103 through which the pile material is drawn, and a suitable refrigerant coil 104 having an inlet at 105 and an outlet at 106. The inlet and outlet are connected to any conventional refrigerating mechanism having suitable heat exchange devices for producing and maintaining a flow of refrigerant through the coil 104 at a sufficiently low temperature to solidify or freeze the compacted mass of pile material into a solid shaft or bundle.

At the bottom or outlet end of the sleeve 103 I locate a plurality of driven wheels 107, 107 having roughened or toothed peripheries 108. These wheels engage the solidified mass of pile material to continuously pull the material from the creel or other source through the wetting chamber and the sleeve 103. A stationary collar or guide 109 is positioned below the wheels 107, 107 to retain the solidified bundle in proper position to be cut into slabs 65, 65 by means of a saw 110 or other suitable cutting device. In the showing of FIGURE 9 the circular saw 110 is driven by a motor 111 through shaft 112. The motor is mounted on a bracket 113 which is oscillated vertically in ways 114 by means of crank 115 journaled in saw carriage 116. A connecting rod 117 is journaled to the bracket 113 at 117a and to the crank 115 at 117b. The vertical movement of the saw and bracket 113 is coordinated with the vertical movement of the bundle of pile material so that as the bundle is continuously drawn through the sleeve 103 the saw 110 cuts a flat slab 65 from the bottom of the bundle and the horizontal movement of the carriage 116 permits the saw to complete the cross-wise cut while the bundle is extended through the sleeve 103. The broken line position 110a of saw 110 shows the saw in the fully advanced horizontal position and also at the bottom of its stroke so that the slabs 65 when completely severed fall onto a chute 120 from whence they are delivered to the conveyor 70.

The apparatus shown in FIGURES 9 and 10 contemplates a bundle of pile material having a substantially square or rectangular cross section. Other shapes of slabs of any symmetrical or asymmetrical form may be produced. Examples of two geometric shapes are shown in FIGURES 13 and 14 in which the sleeve 103a of FIGURE 13 is hexagonal whereas the sleeve 103b in FIGURE 14 is triangular. These shapes are merely representative of the wide variety of forms that can be produced, some of which will be illustrated hereinafter.

The completed pile fabric produced with either the continuous method of FIGURE 9 or the batch method of FIGURE 1 is shown in FIGURE 11 in which the slabs 65 are rectangular in shape and form a substantially flat pile surface. FIGURE 12 shows the pile material in the form of yarns securely embedded in the backing sheet 76 as is produced by the apparatus of FIGURE 7.

Referring now to FIGURE 16, the hexagonal bundle of pile material 125 such as could be formed with the sleeve 103a is utilized to form a multi-height pile fabric 126 shown in FIGURE 20. In this case the slabs 127 are thicker than certain other slabs 128 so that a sculptured honeycomb effect is achieved in the fabric. In FIGURE 17, a relief effect is achieved by means of slabs 129 in the shape of a Greek cross and cut in varying thicknesses from the extruded bundle 130. The crosses 129a are thicker than the crosses 129b to provide the relief effect in the fabric shown in FIGURE 21.

The pile material bundle 135 shown in FIGURE 18 is in the form of a combined St. Andrews and Greek cross which may be interlocked with slabs cut from a bundle 136 shown in FIGURE 19 in the shape of a complementary formé cross. The characteristics of the slabs cut from bundle 135 contrast with slabs cut from bundle 136 in some desired manner such as color, pile material, thickness, or texture. The interlocking arrangement of slabs 135a and 136a is shown in FIGURE 22.

A more complex interlocking of variously shaped bundles is shown in FIGURE 23 which utilizes slabs cut from bundles 140, 141, 142, and 143 shown in FIGURES 23a to 23d. The slabs from bundle 141 nest in the convex sided recess of the slabs cut from bundle 142 whereas slabs cut from bundles 140 and 143 fit in the concave sided recesses as shown in FIGURE 23. The completed interlocking or nesting of slabs 140–143 forms a square which may be turned on its vertical axis to complement or contrast with the design in any of the adjoining squares. The ability to provide such a wide range of contrast design effects is again an important feature of the present invention.

In FIGURE 24 a further variation is shown in which the pile material is produced from a rolled sheet 145 (FIGURE 24a) instead of strands of yarns or other filaments. This rolled sheet may be of any suitable pile forming material and is subjected to the slab severing described previously. Finished units of the fabric as shown in FIGURE 24 may be made from slabs 146a cut from a bundle of filamentary or other pile material as seen in FIGURE 24b having a plurality of concave faces 146, 146 which accept the slabs 145a, 145a that are severed from the bundle 145.

FIGURES 25 and 26 show the style effects that can be achieved by using a triangular bundle 150 such as would be formed in the mold 103b of FIGURE 14. However, in the showing of FIGURE 26, the triangular slabs 151 and 152 are not cut from bundle 150 in parallel planes so that a prismatic relief effect can be produced in the fabric. By the judicious placement of the slabs 151 and 152 a very pleasing diamond or other effect can be achieved.

A somewhat similar effect is shown in FIGURE 28 but in this case the slabs 153 and 154 are cut from a rectangular or square bundle 155. One face of the slabs 153 and 154 is cut in a plane at right angles to the axis of bundle 155 whereas the other face may be cut to form surfaces on the slabs either convex or concave having flat faces 156 and 157 at an angle to the base of the slab which join each other at center lines 158. Here again the random or predetermined relative arrangement of the slabs 153 and 154 in the fabric may be utilized to produce a sculptured effect having highly interesting and pleasing features.

FIGS. 29–33 illustrate a few of the further variations for cutting the upper surfaces of the slabs such as 153 and 154. For example, the slabs 160 and 161 in FIG. 29 have an undulating complementary upper surface. The amplitude and/or frequency of the undulations can be increased to provide a ribbed effect as shown on the upper complementary slabs 162, 163; 164, 165 and 166, 167.

Figure 29:
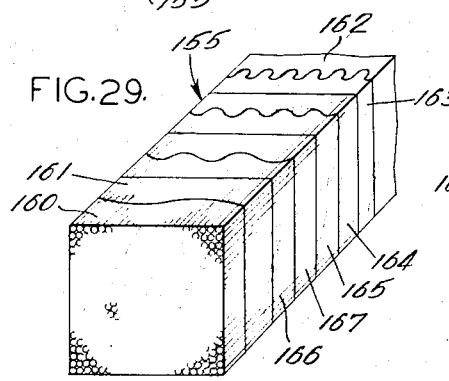
Figure 30:
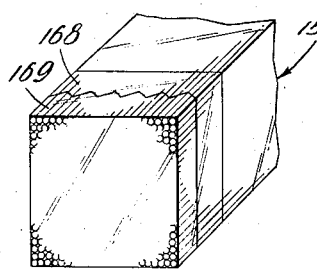
Figure 31:
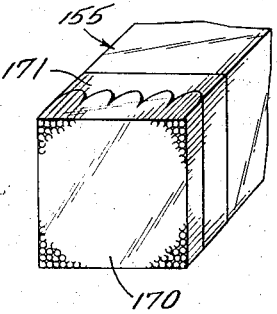
Figure 32:
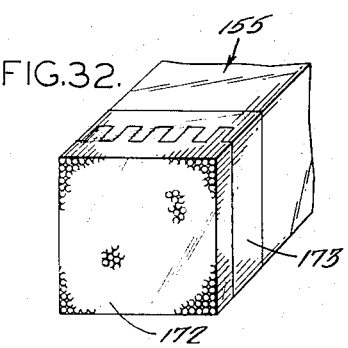
Figure 33:
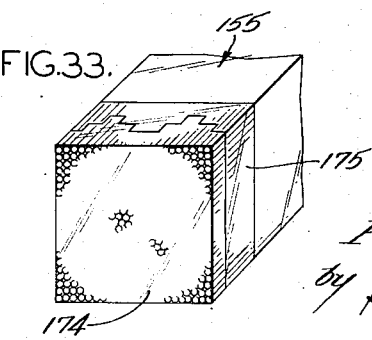

FIGURE 30 shows a serrated pair of complementary slabs 168 and 169 having flat sided ribs as distinguished from the arcuate or curved edges of the slabs in FIGURE 29. Slabs having other forms of ridges with curved top portions and pointed bases are shown at 170 and 171 in FIGURE 31 and various forms of interlocking slabs with flat faces either at right angles or parallel to the axis of the slabs are shown in FIGURES 32 and 33 at 172, 173 and 174, 175.

A conventionalized scroll design is shown in FIGURE 35 in which the units or slabs 180, 180 are cut from a rectangular bundle 181 which is formed of combined pile yarns or strands 182 and arcuate layers 183, 183 of a flat or laminated pile material. This may be in sheet form or may be of strands or filaments but of a contrasting nature. The slabs 180 may be arranged in any desired relationship so that the arcuate designs formed by the laminations 183 are complementary or opposed.

Instead of supplying a separate backing sheet 76 as shown in FIGURE 7, I also propose a modified form in which the pile material, preferably yarns 185, 185 (FIG. 15a), are of a thermoplastic variety. By placing the slabs of this material on a foraminous conveyor belt 70a and passing them through a flash heating zone 186, it is possible to melt the top portion of the slabs in an amount sufficient to fuse the yarns into integral backing sheet 187. The thus formed and fused fabric then passes to a drying zone 188 where all of the solidifying material such as water is removed and permitted to drain through the outlet 189. In this way I form a fabric having the pile yarns fused together at their base to form a dimensionally stable material.

It will thus be understood that I have provided an improved method and apparatus for producing what is commonly known as a "non-woven" pile fabric by utilizing molds to shape a solidified bundle of pile material having a wide variety of contours and compositions. By severing slabs from the individual bundle or bundles it is possible to achieve an almost limitless range of design effects in a pile fabric depending upon the relative thickness and contour of the tops of the slabs. The method is adapted to either a batch or continuous operation and for the first time permits the practical production of both narrow and wide pile fabric such as rugs and carpets on a volume basis as distinguished from the insertion of the individual piles that has been practiced for centuries on the one hand, and the mass production of carpets on broad machinery which has severe limitations as to the style ranges that can be achieved on the other hand.

Having thus described my invention,

I claim:

1. Apparatus for continuously forming a non-woven pile fabric comprising a moistening chamber, means for parallelizing running lengths of pile material in predetermined relationship to each other to form a predetermined pattern, means in said chamber for applying a material freezable under condtions of reduced temperature to the parallelized pile material, means for drawing parallelized pile material through said moistening chamber while the parallelized pile material is in relatively open condition, means for condensing the longitudinally parallelized moving pile material, a mold through which the pile material is drawn in condensed parallel form, a solidifying chamber through which the pile material is progressively advanced under conditions of reduced temperature, cutting means for severing slabs of frozen pile material, a conveyor belt onto which a plurality of said slabs are positioned in pre-arranged relationship, means for applying a backing material to the upturned faces of said slabs while on the conveyor belt, means for raising the temperature of the slabs above the melting point of the freezable material, and means for drying the pile material and curing the backing material.

2. Apparatus in accordance with claim 1 in which the moistening chamber comprises spaced eyeboards and a plurality of jets directed to impinge a l:quid onto the pile material.

3. Apparatus in accordance with claim 1 in which the mold comprises a pair of hinged elements and means for clamping the elements of the mold around a length of compressed pile material.

4. Apparatus in accordance with claim 1 which the solidifying chamber comprises a sleeve and a refrigerant coil, and the cutting means is moveable in two directions to cut the slabs while the pile material is drawn through the solidifying chamber.

5. Apparatus for continuously forming a non-woven pile fabric comprising a moistening chamber, means for parallelizing running lengths of pile material in predetermined relationship to each other to form a predetermined pattern, means in said chamber for applying a material freezable under conditions of reduced temperature to the parallelized pile material, means for drawing parallelized pile material through said moistening chamber while the parallelized pile material is in relatively open condition, means for condensing the longitudinally parallelized moving pile material, a mold through which the pile material is drawn in condensed parallel form, a solidifying chamber through which the pile material is progressively advanced under conditions of reduced temperature, cutting means for severing slabs of frozen pile material, a conveyor belt onto which a plurality of said slabs are positioned in pre-arranged relationship, a fusing chamber through which the conveyor passes the slabs, and means in said chamber to fuse the upper portions of the pile material in the slabs to provide a backing material formed of the pile material.

6. Apparatus for continuously forming a non-woven pile fabric comprising a moistening chamber, means for parallelizing running lengths of pile material in predetermined relationship to each other to form a predetermined pattern, means in said chamber for applying a material freezable under conditions of reduced temperature to the parallelized pile material, means for drawing parallelized pile material through said moistening chamber while the parallelized pile material is in relatively open condition, means for condensing the longitudinally parallelized moving pile material, a mold through which the pile material is drawn in condensed parallel form, a solidifying chamber through which the pile material is progressively advanced under conditions of reduced temperature, cutting means for severing slabs of frozen pile material, a conveyor belt onto which a plurality of said slabs are positioned in pre-arranged relationship, means for applying a backing material to the upturned faces of said slabs while on the conveyor belt, means for applying pressure to the backing material and the slabs, means for raising the temperature of the slabs above the melting point of the freezable material, and means for drying the pile material and curing the backing material.

7. The method of continuously producing a non-woven pile fabric which comprises the steps of feeding a plurality of pile strands into a moistening zone in predetermined spaced parallel relation to each other to form a predetermined pattern, drawing a length of said pile strands through said moistening zone, condensing said movable pile strands into a predetermined shaped bundle, applying a liquid to the pile strands, freezing to solidify the pile strands as they continuously move through a mold under reduced temperature conditions, severing slabs of frozen pile material from the moving shaped bundle of pile material, feeding the severed frozen slabs onto a conveyor in predetermined relationship to each other, continuously feeding a thermoplastic backing material onto the tops of said slabs, elevating the temperature of the backing material at the contact area with the slabs to adhere the backing material to the slabs when positioned in said predetermined relationship, and drying the backing material and the slabs at elevated temperature to form a unitary running length of pile fabric.

8. The method of claim 7 including the steps of cutting the bundle at intermediate points in a plane biased to the axis of the bundle.

9. The method of claim 7 including the step of cutting the bundle at intermediate points to provide an undulating surface for each of the slabs.

10. The method of claim 7 including the step of cutting the bundle at intermediate points to provide serrated surfaces for some of the slabs.

11. The method of claim 7 in which the slabs are subjected to a partial drying at elevated temperature prior to feeding the backing material.

12. The method of claim 7 in which the backing material is subjected to elevated temperature prior to contact with the tops of the slabs.

13. The method of continuously producing a non-woven pile fabric which comprises the steps of feeding a plurality of thermoplastic pile strands in to a moistening zone in predetermined spaced parallel relation to each other to form a predetermined pattern, drawing a length of said pile strands through said moistening zone, condensing said moving pile strands into a predetermined shaped bundle, applying a liquid to the pile strands, freezing to solidify the pile strands as they continuously move through a mold under reduced temperature conditions, severing slabs of frozen pile material from the moving shaped bundle of pile material, feeding the severed frozen slabs into a conveyor in predetermined relationship to each other, elevating the temperature of the upper portions of said slabs to fuse the upper portions of said thermoplastic pile strands in the slabs to provide a backing material formed of the pile strands, and drying and curing the backing material and the slabs at elevated temperature to form a unitary running length of pile fabric.

References Cited

UNITED STATES PATENTS

| | | | |
|---|---|---|---|
| 1,012,389 | 12/1911 | Marche | 156—72 |
| 3,026,544 | 3/1962 | Persicke et al. | 161 |
| 3,085,922 | 4/1963 | Koller | 161—72 |

FOREIGN PATENTS

| | | |
|---|---|---|
| 709,498 | 2/1958 | Great Britain. |

J. H. STEINBERG, *Primary Examiner.*